US012774916B2

(12) United States Patent
Sahni

(10) Patent No.: US 12,774,916 B2
(45) Date of Patent: Oct. 27, 2026

(54) FOLDABLE PERSONAL SCALE

(71) Applicant: Gaganbir Sahni, Cumming, GA (US)

(72) Inventor: Gaganbir Sahni, Cumming, GA (US)

( * ) Notice: Subject to any disclaimer, the term of this patent is extended or adjusted under 35 U.S.C. 154(b) by 329 days.

(21) Appl. No.: 18/392,564

(22) Filed: Dec. 21, 2023

(65) Prior Publication Data

US 2024/0210235 A1 Jun. 27, 2024

Related U.S. Application Data

(60) Provisional application No. 63/435,064, filed on Dec. 23, 2022.

(51) Int. Cl.
*G01G 21/23* (2006.01)
*G01G 19/44* (2006.01)

(52) U.S. Cl.
CPC ............. *G01G 21/23* (2013.01); *G01G 19/44* (2013.01)

(58) Field of Classification Search
CPC ............................... G01G 19/44; G01G 21/23
See application file for complete search history.

(56) References Cited

U.S. PATENT DOCUMENTS 4,711,313 A * 12/1987 Iida ........................ G01G 21/28 177/127
4,765,421 A * 8/1988 Newton ................. G01G 19/44 177/127
5,414,225 A * 5/1995 Garfinkle ............... G01G 21/22 177/127
2009/0173550 A1* 7/2009 Gerster .................. G01G 21/22 177/126
2009/0229889 A1* 9/2009 Lin ........................ G01G 21/22 177/25.18
2014/0297229 A1* 10/2014 Izumo .................... G01G 23/48 702/189
2016/0349105 A1* 12/2016 Oneda .................... G01G 21/22

FOREIGN PATENT DOCUMENTS

CN 106895899 A * 6/2017 ........... G01G 19/002
CN 108709619 A * 10/2018 ............. G01G 23/00
GB 2422018 A * 7/2006 ............. G01G 19/44
GB 2532078 A * 5/2016 ........... A61G 7/0527

OTHER PUBLICATIONS

Machine translation of CN-108709619-A (Year: 2018).*
Machine translation of CN-106895899-A (Year: 2017).*

* cited by examiner

*Primary Examiner* — Natalie Huls

(57) ABSTRACT

A personal foldable scale includes two weight-bearing platforms secured together by double-hinge members to allow the foldable scale to fold such that the two weight-bearing platforms face each other in a folded configuration. The foldable scale includes a display for digitally representing weight, time, and temperature measurements.

14 Claims, 11 Drawing Sheets

FOLDABLE PERSONAL SCALE

CROSS-REFERENCE TO RELATED APPLICATIONS

This application claims priority to U.S. provisional patent application No. 63/435,064, filed on Dec. 23, 2022, the contents of which are fully incorporated herein.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIALS SUBMITTED ON A READ-ONLY OPTICAL DISC, AS A TEXT FILE OR AN XML FILE VIA THE PATENT ELECTRONIC SYSTEM

Not applicable.

STATEMENT REGARDING PRIOR DISCLOSURES BY THE INVENTOR OR A JOINT INVENTOR

Not applicable.

BACKGROUND OF THE INVENTION

The present invention relates to a personal scale for measuring and displaying one or more measured values, including weight of a user, body mass index (BMI) of a user, temperature, and time. The personal scale is foldable via a multiple hinge system for ease of travel and storage.

BRIEF SUMMARY OF THE INVENTION

According to an embodiment of the present invention, a foldable personal scale includes a first weight-bearing platform rotatably secured to a first rotating member such that the first weight-bearing platform is radially rotatable relative to the first rotating member; a second weight-bearing platform rotatably secured to a second rotating member such that the second weight-bearing platform is radially rotatable relative to the second rotating member; and one or more double-hinge members, each double-hinge member of said one or more double-hinge members radially rotatably secured to both the first rotating member and the second rotating member.

The foldable personal scale embodiment may be further modified, wherein the first weight-bearing platform further comprises one or more first tube members along a side of the first weight-bearing platform, each first tube member of the one or more first tube members coaxially secured around the first rotating member; and the second weight-bearing platform further comprises one or more second tube members along a side of the second weight-bearing platform, each second tube member of the one or more second tube members coaxially secured around the second rotating member.

The foldable personal scale embodiment may be further modified, wherein a plurality of feet members are secured along a bottom surface of both the first weight-bearing platform and the second weight-bearing platform.

The foldable personal scale embodiment may be further modified, wherein each of the first weight-bearing platform and the second weight-bearing platform house one or more load sensors configured for measuring a user's weight.

The foldable personal scale embodiment may be further modified, further comprising a processor, a digital display, and a signal conditioner for transforming a force exerted on the first weight-bearing platform and the second weight-bearing platform into an electrical signal to be displayed on the digital display, and wherein the one or more load sensors are electronically connected to the processor, the digital display, and the signal conditioner.

The foldable personal scale embodiment may be further modified, wherein the digital display is provided on an upper surface of either the first weight-bearing platform or an upper surface of the second weight-bearing platform.

The foldable personal scale embodiment may be further modified, further comprising a temperature sensor electronically connected to the processor, the digital display, and the signal conditioner to provide temperature measurements.

The foldable personal scale embodiment may be further modified, further comprising a Bluetooth module electronically connected to at least the processor to configure the foldable personal scale for wireless communication with other electronic devices.

The foldable personal scale embodiment may be further modified, wherein the digital display simultaneously displays multiple measurement values, including weight, time, and temperature.

The foldable personal scale embodiment may be further modified, wherein the foldable personal scale is foldable and unfoldable between a measurement configuration and a storage configuration, the measurement configuration having the first weight-bearing platform and the second weight-bearing platform positioned side-by-side and the storage configuration having an upper surface of the first weight-bearing platform and an upper surface of the second weight-bearing platform positioned against each other.

According to another embodiment of the present invention, the foldable personal scale includes a first weight-bearing platform; a second weight-bearing platform; and an intermediate platform positioned between the first weight-bearing platform and the second weight-bearing platform, wherein one or more double-hinge members connect rotatably secure the first weight-bearing platform to the intermediate platform and one or more double-hinge members connect rotatably secure the second weight-bearing platform to the intermediate platform, each double-hinge member of said one or more double-hinge members providing two axes of rotation.

BRIEF DESCRIPTION OF THE SEVERAL VIEW OF THE DRAWINGS

When describing the embodiments of the present invention, reference will be given to the following drawings.

DETAILED DESCRIPTION OF THE INVENTION

Figure 1:
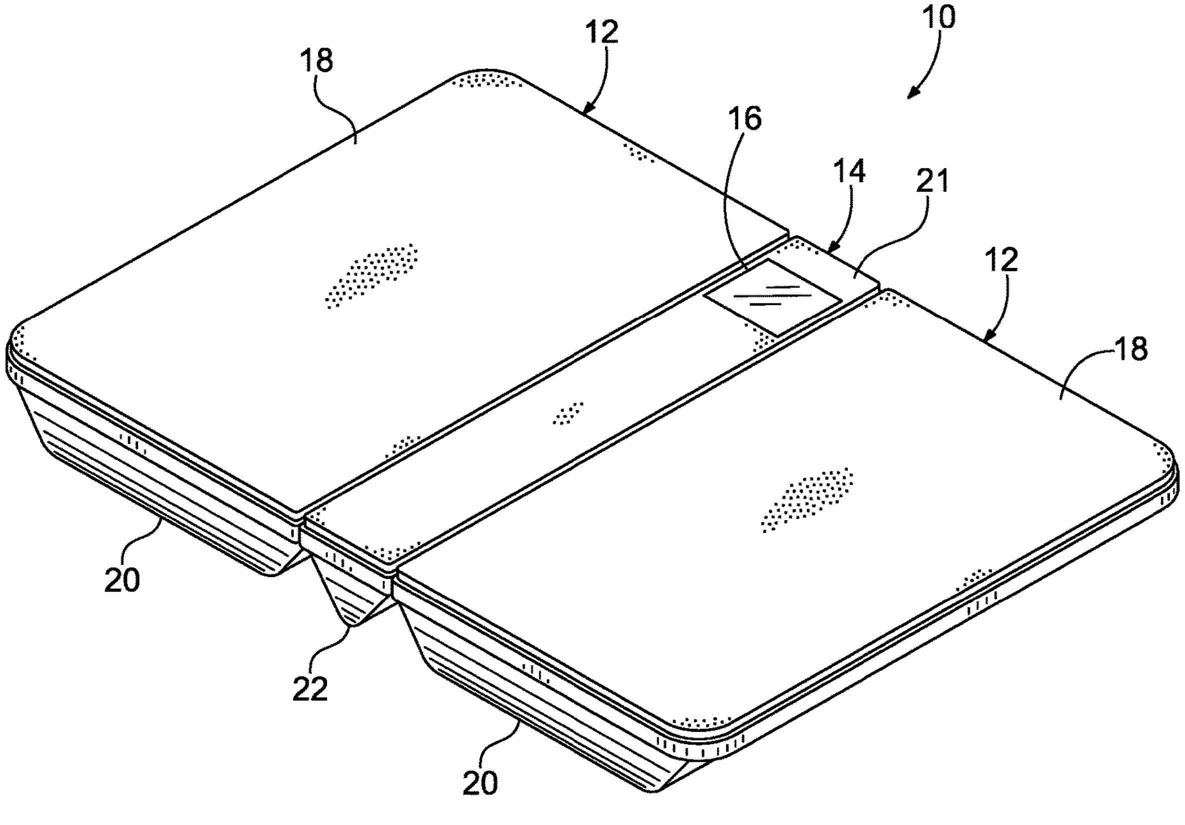
FIG. 1 is a top perspective view of an embodiment of a foldable personal scale, the foldable scale fully unfolded to a weight-measuring configuration.
Figure 2:
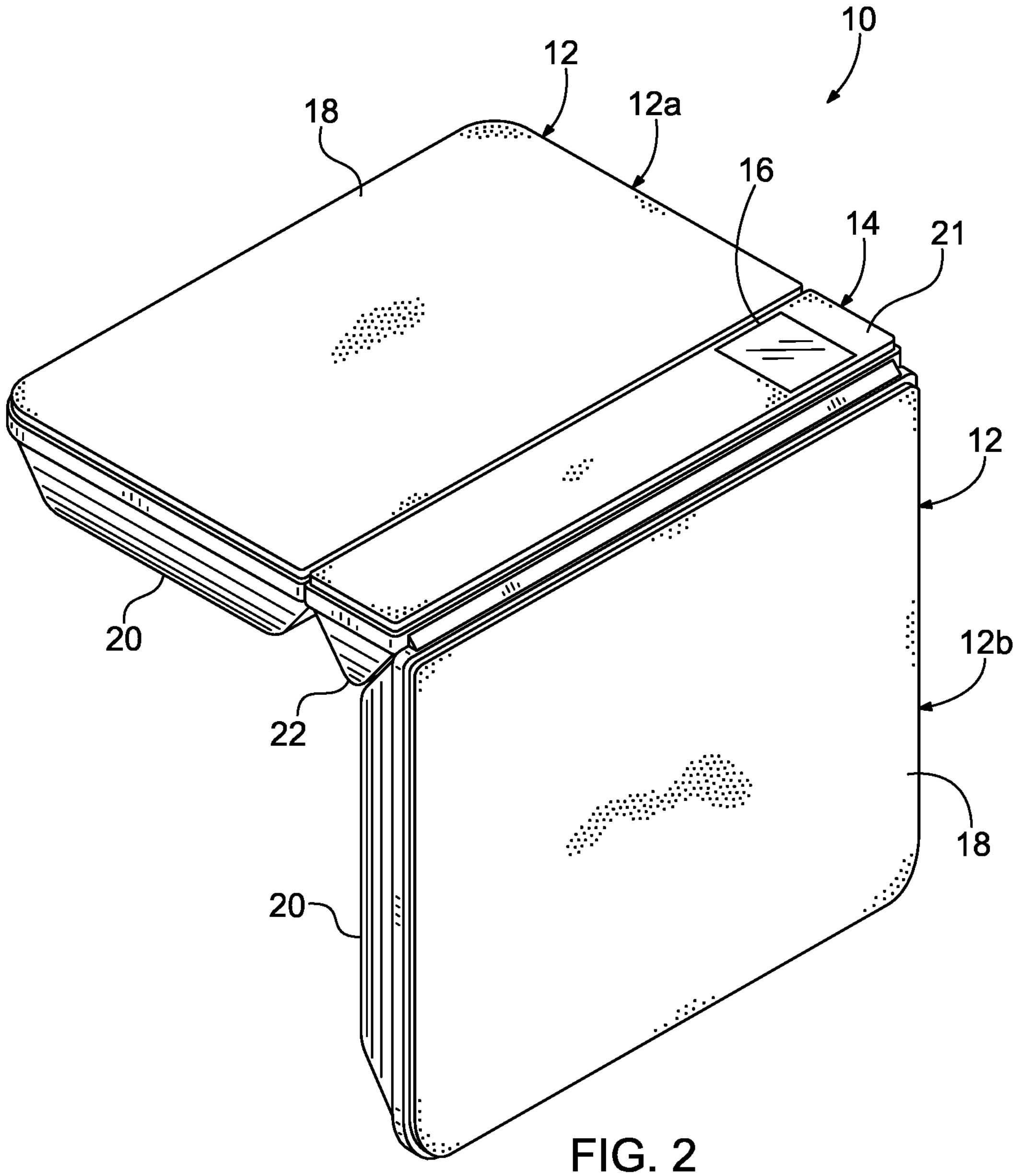
FIG. 2 is a top perspective view of the scale embodiment of FIG. 1, with one weight-bearing panel fully folded.
Figure 3:
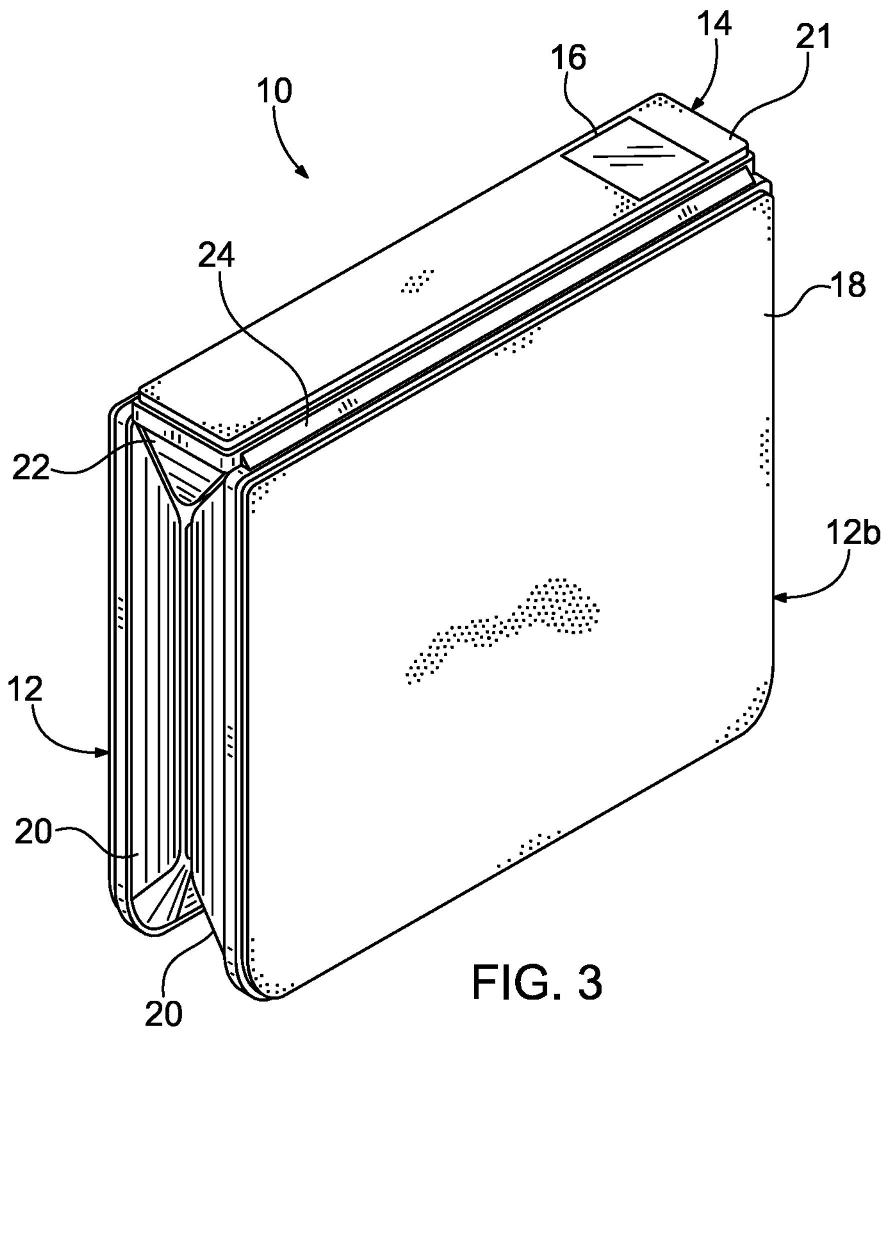
FIG. 3 is a top perspective view of the scale embodiment of FIG. 1, with both weight-bearing panels fully folded and the scale in a storage configuration.
Figure 4:
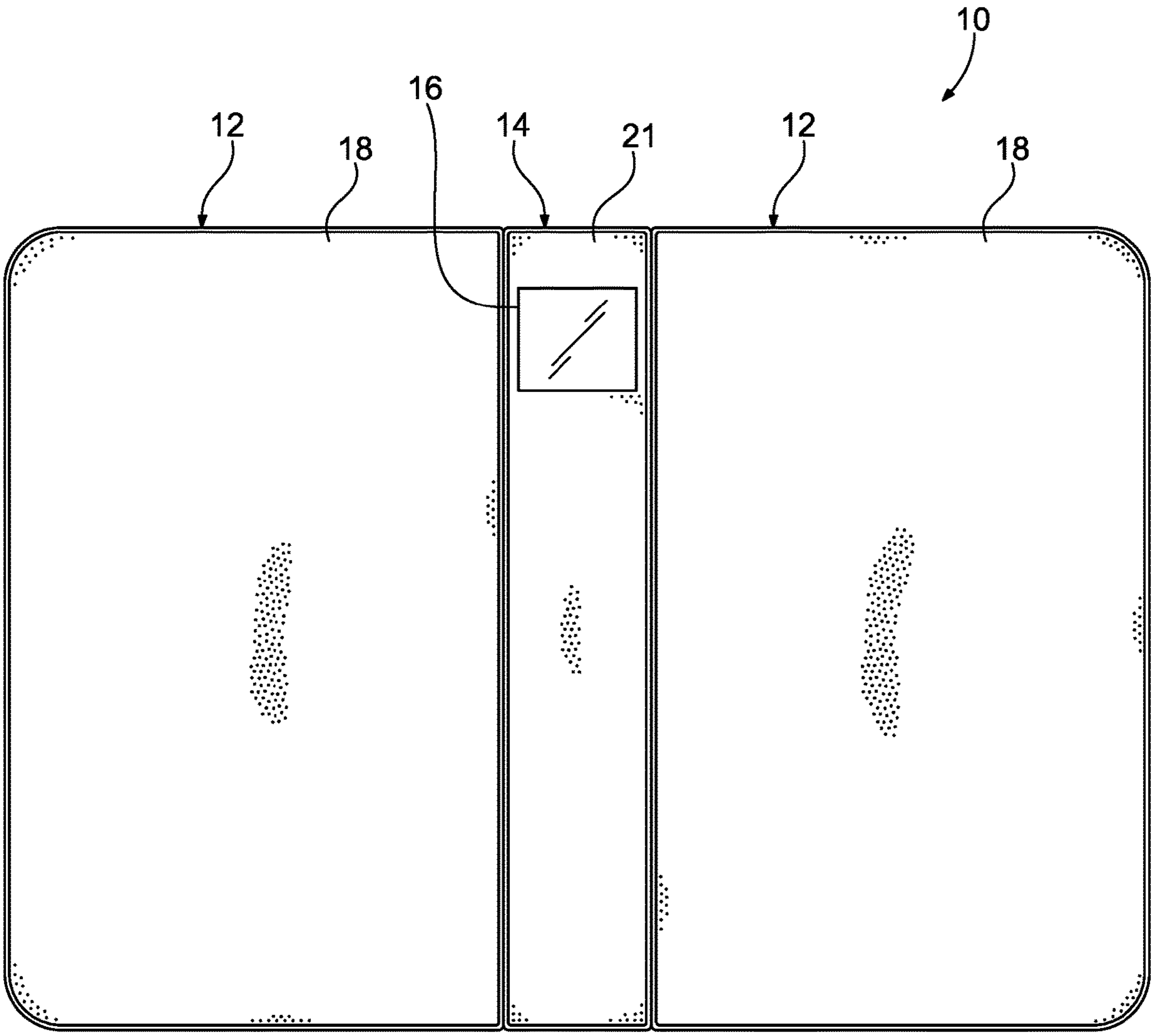
FIG. 4 is a top view of the scale embodiment of FIG. 1.
Figure 5:
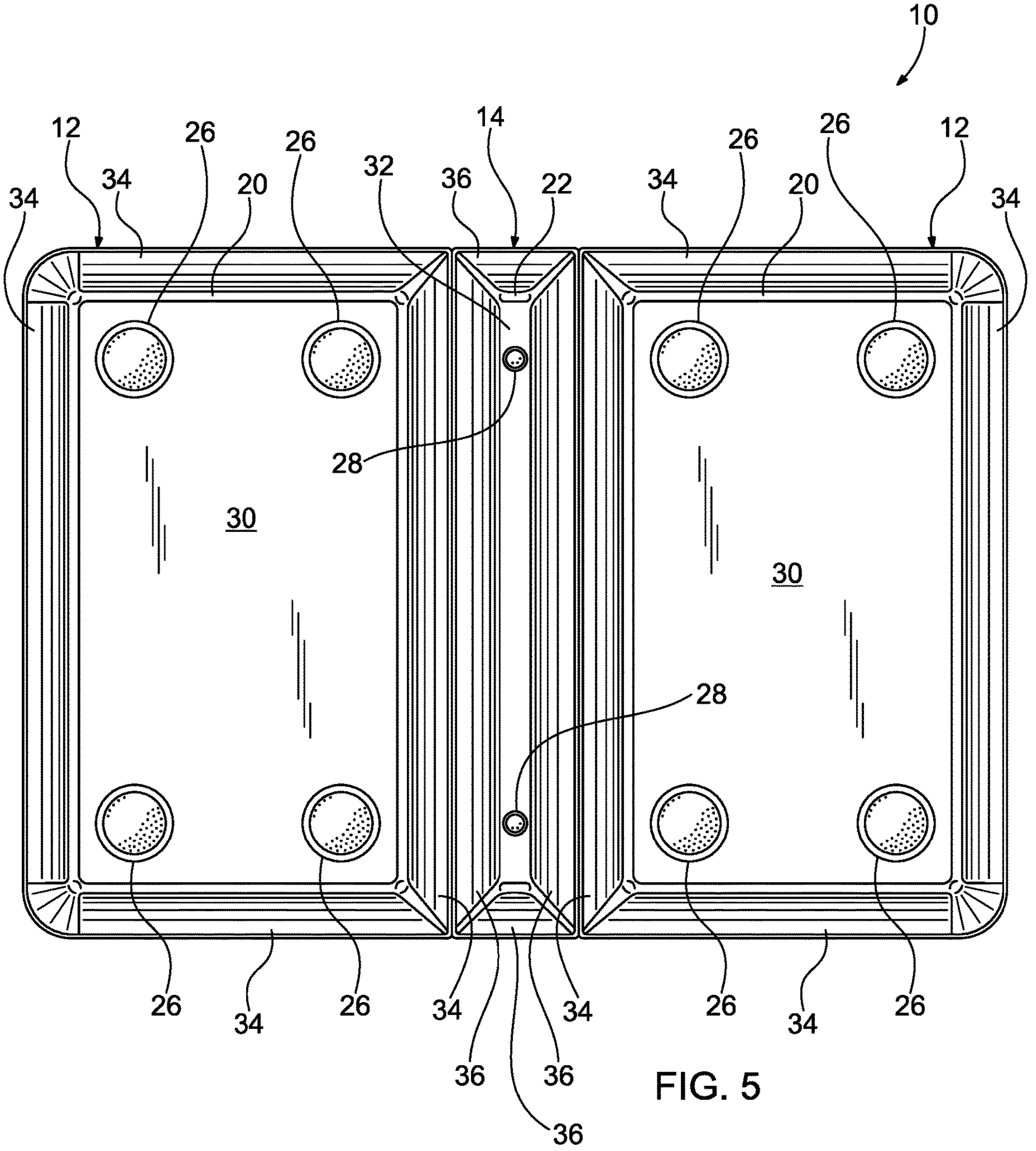
FIG. 5 is a bottom view of the scale embodiment of FIG. 1.
Figure 6:
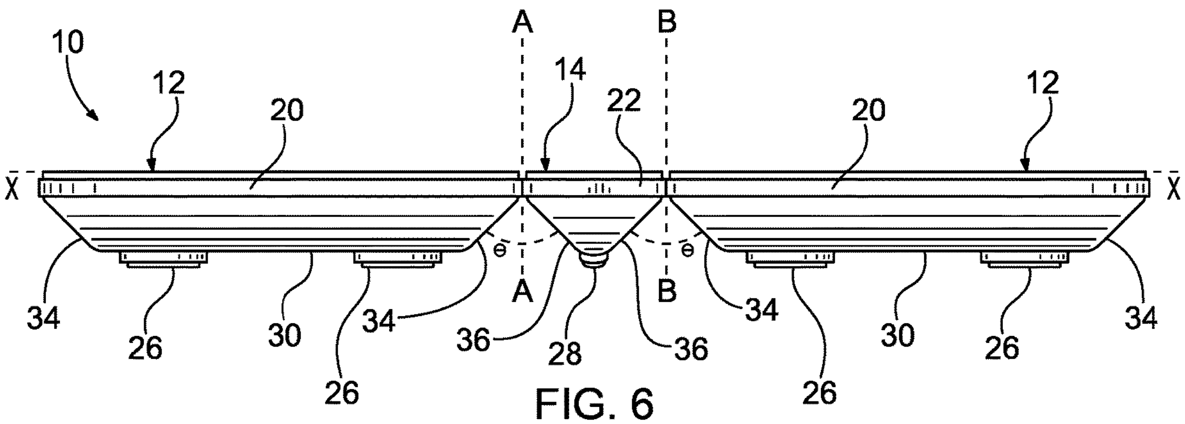
FIG. 6 is a front view of the scale embodiment of FIG. 1, with the scale being in the unfolded, weight-bearing configuration.
Figure 7:
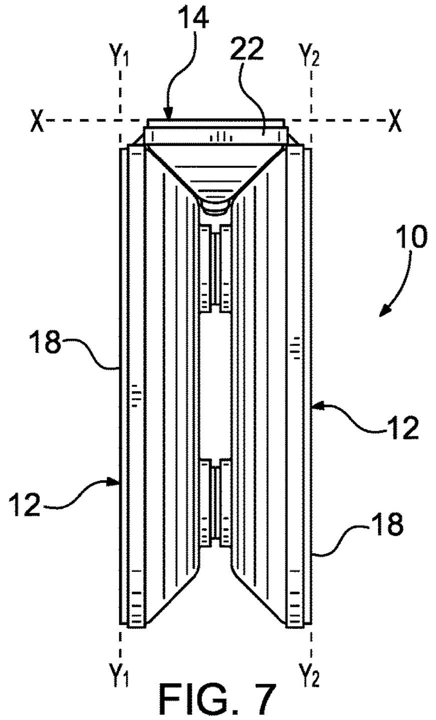
FIG. 7 is a front view of the scale embodiment of FIG. 1, with the scale being in the folded, storage configuration.
Figure 8:
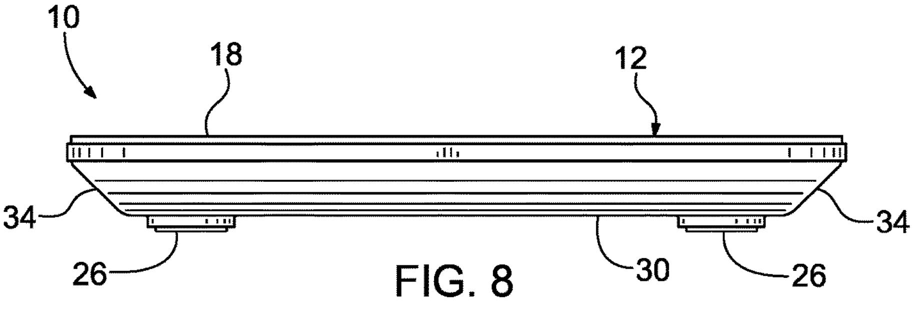
FIG. 8 is a side view of the scale embodiment of FIG. 1.
Figure 9:
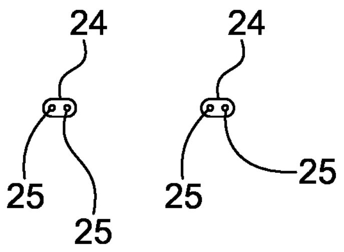
FIG. 9 is an end view of double-hinge members of the scale embodiment of FIG. 1.
Figure 10:
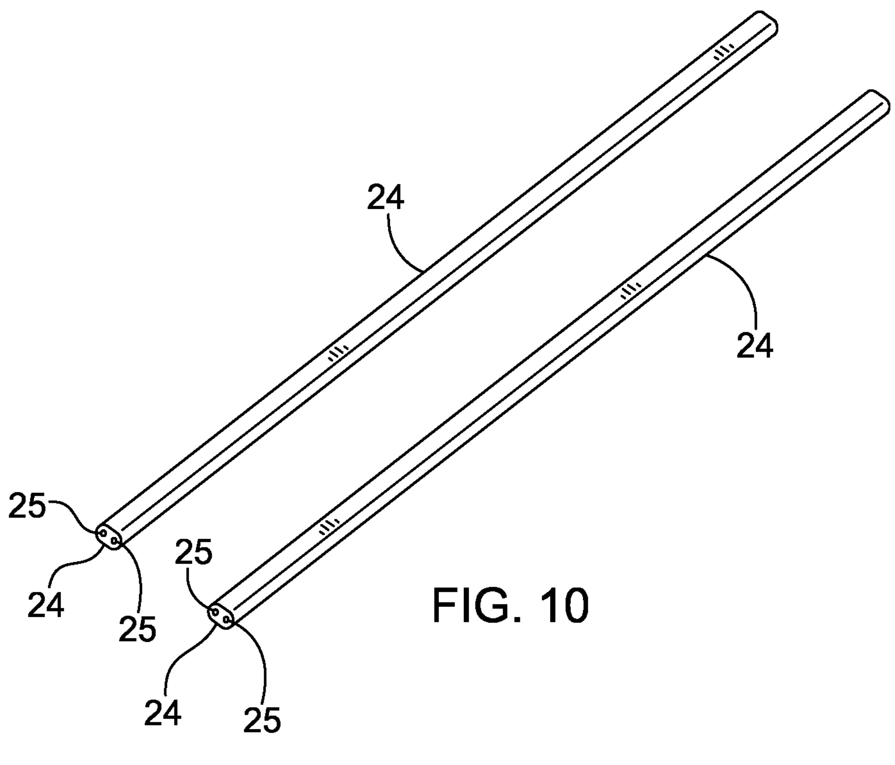
FIG. 10 is a perspective view of two double-hinge members of FIG. 9, which are both present in the scale embodiment of FIG. 1.
Figure 11:
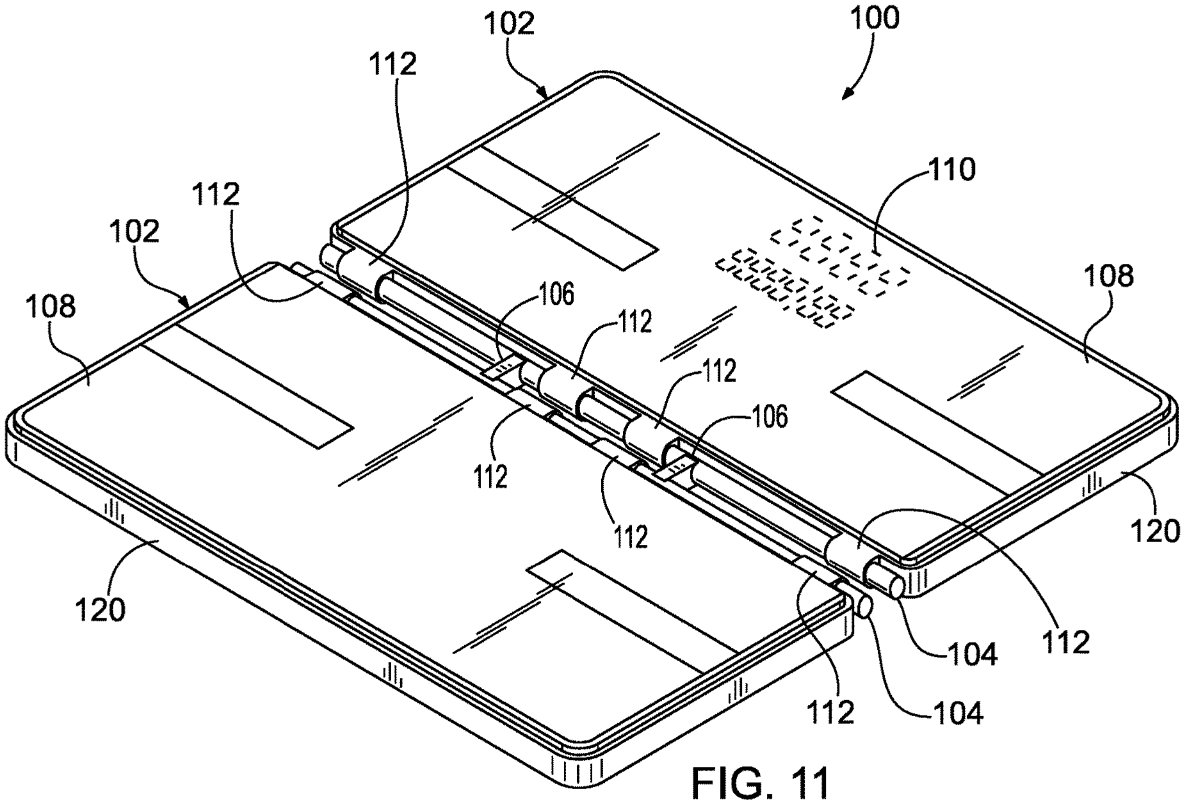
FIG. 11 is a top, side, and back perspective view of a second embodiment of a foldable personal scale according to the present invention.
Figure 12:
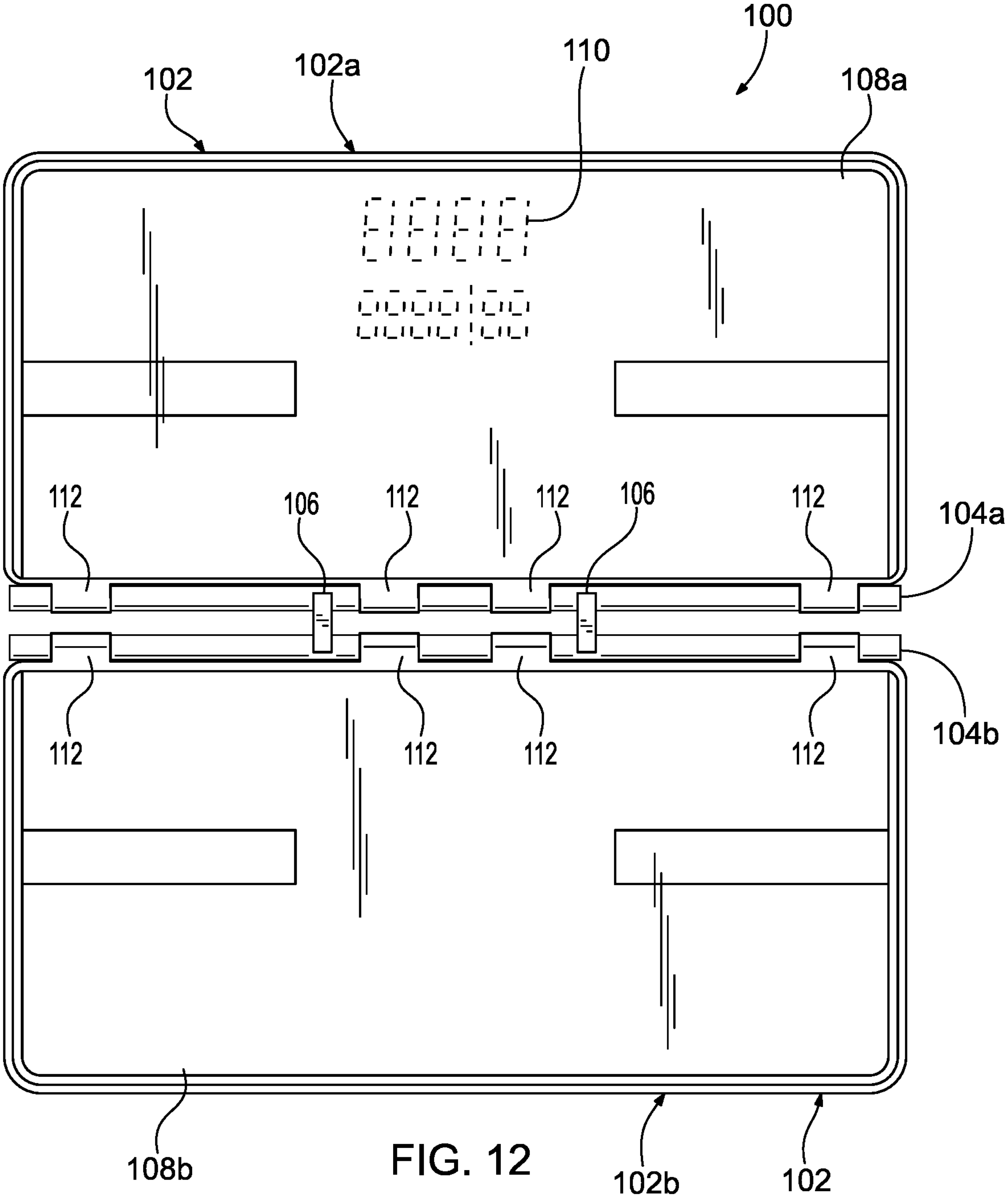
FIG. 12 is a top view of the scale embodiment of FIG. 11.
Figure 13:
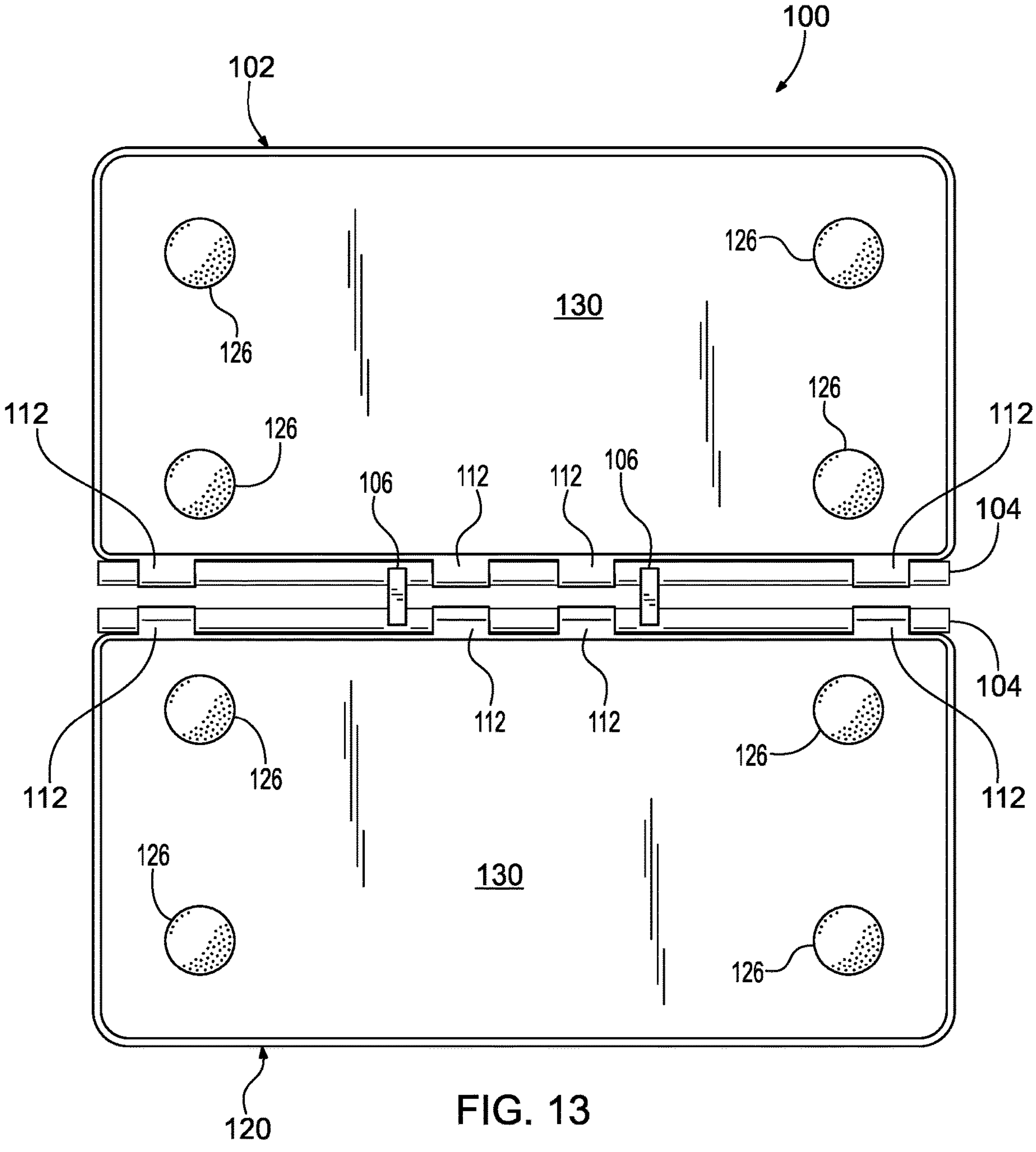
FIG. 13 is a bottom view of the scale embodiment of FIG. 11.
Figure 14:
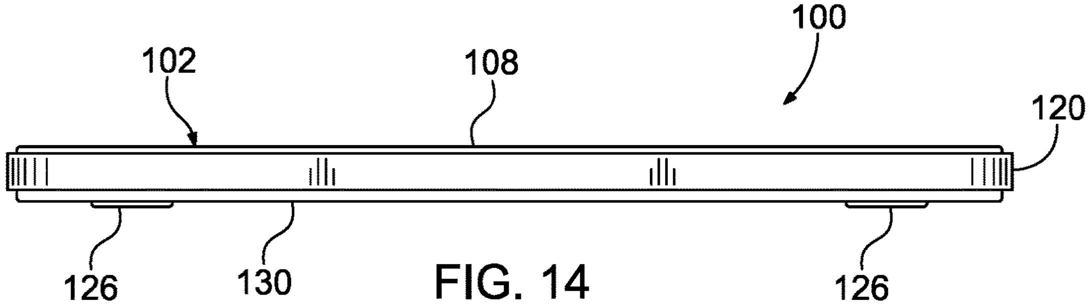
FIG. 14 is a side view of the scale embodiment of FIG. 11.
Figure 15:
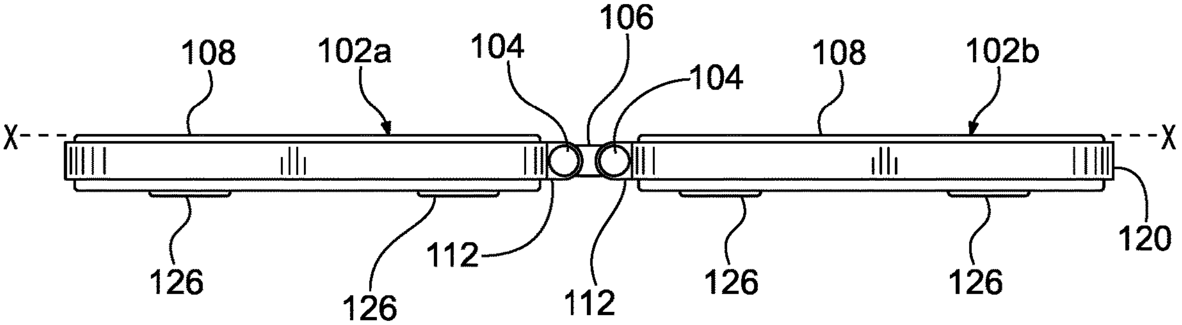
FIG. 15 is a front view of the scale embodiment of FIG. 11 in a measurement configuration.

An embodiment of a personal foldable scale 10 is provided in FIGS. 1-8. The foldable scale 10 includes weight-bearing platforms 12, typically two such platforms with one corresponding to each foot of a user. The scale 10 also includes an intermediate platform 14 positioned between each weight-bearing platform 12. The intermediate platform 14 is rotatably connected to each weight-bearing platform 12.

Each weight-bearing platform 12 includes a housing 20 and an upper surface 18 positioned on top of the housing with the upper surface configured to receive a foot of the user for measuring weight. The upper surface 108 is made of a rigid material, including but not limited to glass, metal, or plastic. The upper surface 18 may also include a layer of anti-slip rubber or similar material to provide sufficient friction to prevent slippage of a user's foot. The upper surface 18 is ideally flat to provide even, level surfaces for a user to receive a precise and accurate weight measurement. However, the upper surface may be slightly contoured to the foot or otherwise shaped as known in the art.

The housing 20 of each weight-bearing platform 12 contains within it one or more load sensors, not shown, secured within the housing and to the corresponding upper surface 18 and evenly spaced to ensure stability of a user when they step onto the scale 10 and precision of weight measurements. Preferably, there are four load sensors in each weight-bearing platform 12, with there preferably being two weight-bearing platforms for the scale 10, for a total of eight (8) load sensors.

Each housing 20 also includes a bottom surface 30 opposite to the upper surface 18. The upper surface 18 and bottom surface 30 are preferably parallel to each other. However, the bottom surface 30 may be curved or otherwise not perfectly flat. Multiple legs 26 are positioned along the bottom surface 30 of each housing 20. The legs 26, along with legs 28, preferably extend from the bottom surface 30 such that they all end along a same plane to provide stability to the scale 10 in a measurement configuration. This also helps ensure that the upper surfaces 18 and 21 also evenly extend along plane X in the measurement configuration. Legs 126 preferably uniform in shape to provide stability and leveling of the scale 10 on a surface. The housing 20 also has at least one sloped surface 34 positioned adjacent to the bottom surface 30. The sloped surface 34 is angled at 45° relative to a vertical axis A or vertical axis B.

The intermediate platform 14 also includes a housing 22 and an upper surface 21. The upper surface 21 is made from a rigid material, preferably the same material used for the upper surfaces 18. However, the upper surface 21 may be made from a material different than the material of upper surfaces 18. A display 16 is also provided along the upper surface 21 and shows measurement information, which may include one or more of user weight, user BMI, temperature, and time. The display is preferably digital but may be analog or dial. The display 16 is operably secured to at least the load sensors in the weight-bearing platforms 12. If the display 16 is digital, then the display is electronically connected to an electronic board, not shown, which is also connected to the load sensors and signal conditioners, not shown. These components may be connected together by wires or wirelessly and allow for the measurement of weight data via the load sensors, conversion of analog measurement signals via the signal conditioners, processing of measurement signals via the electronic board, and display of measurement signals as numerical values via the display 16. Temperature sensors, not shown, may also be present in the scale 10, and housed in the housing 20 and/or 22, and electronically connected to corresponding signal conditioners, the electronic board, and display 16. A clock, not shown, may also be incorporated into the display 16.

The housing 22 of the intermediate platform 14 also includes a bottom surface 32 opposite to the upper surface 21. The upper surface 21 and bottom surface 32 are preferably parallel to each other. One or more legs 28 are positioned along the bottom surface 32 of the housing 22. The legs 28 are uniform in height or extension from the bottom surface 32 and preferably uniform in shape to provide stability and leveling of the scale 10 on a surface. The housing 22 also has at least two sloped surfaces 36 positioned adjacent to the bottom surface 30 and opposite to each other and sloped surfaces 34. The sloped surfaces 36 are angled at 45° relative to a vertical axis A or vertical axis B.

The weight-bearing platforms 12 are attached to the intermediate platform 14 via one or more double-hinge members 24. Each double-hinge member 24 has two pivot axes 25 at each longitudinal end which serve as both connection points to the platforms 12 and 14 and delineate an axis of rotation between opposing pivot axes at each end of the double-hinge members. Each weight-bearing platform 12 is attached to the pivot axis 25 of a double-hinge member 24 such that the weight-bearing platform is rotatable relative to the double-hinge member along the pivot axis. That double-hinge member 24 is also rotatably attached to the intermediate platform 14 such that the double-hinge member is rotatable relative to the intermediate platform. This attachment also means that the weight-bearing platform 12 is rotatable relative to the intermediate platform 14. In the embodiment of FIGS. 1-8, the scale 10 includes two weight-bearing platforms 12*a*, 12*b*, and therefore includes two double-hinge members 24. One double-hinge 24 member, not shown, rotatably secures platform 12*a* to intermediate platform 14, and a second double-hinge member 24 rotatably secures platform 12*b* to the intermediate platform. The double-hinge members 24 may each be hollow and have multiple openings through which wiring, not shown, may extend through such that load sensors may be secured to the signal conditioners, processor (electronic board), and display across the weight-bearing platform 12 to the intermediate platform 14 and vice versa. In this manner, wiring is sealed and covered by the platforms 12*a*, 12*b*, and 14 and the double-hinge members 24 to protect it from damage or interference. The double-hinge members 24 act as both bridges for wiring across platforms 12*a* and 12*b* and as multiple rotational axes for movement of the scale 10 between the storage and measurement configurations.

The double-hinge members 24 allow each weight-bearing platform 12 to rotate at an angle θ of 90° relative to the intermediate platform 14. The sloped surfaces 34 of the weight-bearing platforms 12 and sloped surfaces 36 of the intermediate platform 14 all having 45° angles relative to the vertical axes A and B further allow the 90° freedom of movement. This freedom of movement allows the scale 10 to be moveable between a measurement configuration and a storage configuration. In the measurement configuration, the upper surfaces 18 of each weight-bearing platform 12 share a single horizontal plane X. Preferably, the upper surface 20 of the intermediate platform 14 also share the horizontal plane X. This configuration allows the scale 10 to be placed upon a floor or horizontal surface for a user to safely stand on the weight-bearing platforms 12 to measure their weight.

The storage configuration includes the upper surfaces 18 of the weight-bearing platforms 12 along different, but parallel, planes $Y_1$ and $Y_2$. These planes are $Y_1$ and $Y_2$ are perpendicular to the upper surface 20 of the intermediate platform 14 and plane X. The bottom surfaces 30 of the weight-bearing platforms 12*a* and 12*b* are positioned toward each other and the respective feet 26 of each platform 12*a* and 12*b* may touch. The angle θ between the sloped surfaces 34 and 36 is now 0°, instead of the 90° angle θ of the measurement configuration. The storage configuration of the scale 10 provides a more compact configuration that allows for easier storage of the device.

The scale 10 may also include other features that are not shown but are standard to known scales. The scale 10 may include a power button for turning the device on and off. The scale may also include a USB port for charging an onboard rechargeable battery stored within the scale and supplying power to the electronic components, including sensors, converters, electronics board, display, and other similar components that may be included. The scale 10 may instead have a battery compartment that is configured to house disposable batteries for powering electronic components, including sensors, converters, electronics board, display, and other similar components that may be included.

Another embodiment of the foldable personal scale 100 is shown in FIGS. 11-16. The scale 100 includes at least two weight-bearing platforms 102, including a first weight-bearing platform 102*a* and a second weight-bearing platform 102*b*. Each weight-bearing platform 102 is rotatably secured to a rotating member 104 such that the weight-bearing platform is radially rotatable relative to the corresponding rotating member. The rotating member 104 longitudinally extends along a length of a side of the corresponding weight-bearing platform 102, but may vary in length and size, including diameter. In the scale 100 embodiment shown in FIGS. 11-16, rotating member 104*a* is secured directly to weight-bearing platform 102*a* by hollow tube members 112 of platform 102*a* and rotating member 104*b* is secured directly to weight-bearing platform 102*b* by hollow tube members 112 of platform 102*b*. In other embodiments of the scale 100, particularly with more weight-bearing platforms 102, each rotating member 104 may be secured directly to two or more weight-bearing platforms.

The rotating members 104 are secured together by one or more double hinge members 106, each double-hinge member of said one or more double-hinge members is radially and rotatably secured to both the rotating member 104*a* and the rotating member 104*b*. The double-hinge members 106 are similar if not identical in function to the double-hinge members 24 of the previous embodiment but are structurally shorter. However, the double-hinge members 106 may vary in length and width, like the double-hinge members 24.

Each weight-bearing platform 102; 102*a*, and 102*b* includes a housing 120 and an upper surface 108 positioned on top of the housing with the upper surface configured to receive a foot of the user. The upper surface 108 is made of a rigid material, including but not limited to glass, metal, or plastic. The upper surface 108 may also include a layer of anti-slip rubber or similar material to provide sufficient friction to prevent slipping of a user. The upper surface 108 is ideally flat to provide an even, level surface for a user to place their foot to receive a precise and accurate weight measurement. However, the upper surface 108 may be slightly contoured to the foot or otherwise shaped as known in the art.

The housing 120 of each weight-bearing platform 102 contains within it one or more load sensors, not shown, secured within the housing and to the corresponding upper surface 108 and evenly spaced to ensure stability of a user when they step onto the scale 100 and precision of weight measurements. Preferably, there are four load sensors in each weight-bearing platform 102, with there preferably being two weight-bearing platforms for the scale 100, for a total of eight (8) load sensors.

Each housing 120 also includes a bottom surface 130 opposite to the upper surface 108. The upper surface 108 and bottom surface 130 are preferably parallel to each other, however the bottom surface may be curved or otherwise shaped. Multiple legs 126 are positioned along the bottom surface 130 of each housing 120 of the weight-bearing platforms. The legs 126 are uniform in height and preferably uniform in shape to provide stability and leveling of the scale 100 on a surface.

Each weight-bearing platform 102 also includes the one or more tube members 112 with openings on either end and a hollow cavity extending between each end. The tube members 112 are positioned along a same side of each weight-bearing platform 102 such that all tube members corresponding to the same rotating member 104 are coaxial along each of their openings with every other tube member and their respective openings secured to the same weight-bearing platform. The rotating member 104 corresponding to the weight-bearing platform 102 is secured within and through each of the tube members 112 of that platform such that the rotating member extends through each opening of each corresponding tube member and is coaxial with each corresponding tube member.

Each double-hinge member 106 has opposing ends, each with an attachment point, commonly an opening therethrough. The double-hinge member 106 is attached to the opposing rotating members 104*a* and 104*b* such that the corresponding opening of the double-hinge member and corresponding rotating member are coaxial. Further, the double-hinge members 106 secure the rotating members 104 together such that the rotating members extend parallel to each other. Both rotating members 104*a* and 104*b* may therefore simultaneously rotate relative to the double-hinge member 106. Additionally, the double-hinge members 106 and one of the rotating members and its corresponding weight-bearing platform 102 may radially rotate relative to the other rotating member, and vice versa.

The double-hinge members 106 may each be hollow and have multiple openings, other than the openings through which the rotating members 104 are secured, through which wiring, not shown, may extend inside and through the double-hinge members such that load sensors may be secured via wires to the signal conditioners, processor (electronic board), and display across the weight-bearing platforms 102 and to the display 110. In this manner, wiring is internally sealed within the scale 100 and covered by the platforms 102*a*, 102*b* and the double-hinge members 106 to protect it from damage or interference. In this manner, the double-hinge members 106 act as both bridges for wiring across platforms 102*a* and 102*b* and as multiple rotational axes for movement between the storage and measurement configurations.

A display 110 is provided along an upper surface 108 of one of the weight-bearing platforms and shows measurement information, which may include one or more of user weight, user BMI, temperature, and time. The display may be provided on either platform 102*a* or 102*b*. Different measurements may be shown simultaneously and in different colors. The display is preferably digital but may be analog or dial. The display 110 is operably secured to at least the load sensors in the weight-bearing platforms 102*a* and 102*b*. If the display 10 is digital, then the display is electronically connected to an electronic board, not shown, which is also connected to the load sensors and signal conditioners, not shown. These components may be connected together with wires or wirelessly and allow for the measurement of weight data via the load sensors, conversion of analog measurement signals via the signal conditioners, processing of measurement signals via the electronic board, and display of measurement signals as numerical values via the display 110. Temperature sensors, not shown, may also be present in the scale 100, and housed in the housing 120 of either or both of platforms 102*a* or 102*b*, and electronically connected to corresponding signal conditioners, the electronic board, and display 110. A clock, not shown, may also be incorporated into the display 110.

Either embodiment of the scale 10, 100 may also include a Bluetooth module for wirelessly connecting to and communicating with a remote electronic device. The scale 10, 100 may wirelessly transmit measurement data gathered and produced by the scale to the remote electronic device, and also wirelessly receive further measurements from the remote electronic device based on data gathered and sent by the scale, including BMI measurements. Such measurements may also be displayed via the display 110.

The double-hinge members 106 and rotating members 104 together allow each weight-bearing platform 102*a* or 102*b* to rotate at least 180° relative to the other weight-bearing platform 102*b* or 102*a*, respectively. This freedom of movement allows the scale 100 to be moveable between a measurement configuration and a storage configuration. In the measurement configuration, shown for example in FIG. 15, the upper surfaces 108 of each weight-bearing platform 102 share a single horizontal plane X, or in other words lays flat on a floor or other surface. The surface need not be perfectly flat, but enough so that the scale 100 is stable enough for measurement. This configuration allows the scale 100 to be placed upon a floor or horizontal surface for a user to safely stand on the weight-bearing platforms 102*a* and 102*b* to measure their weight.

Figure 16:
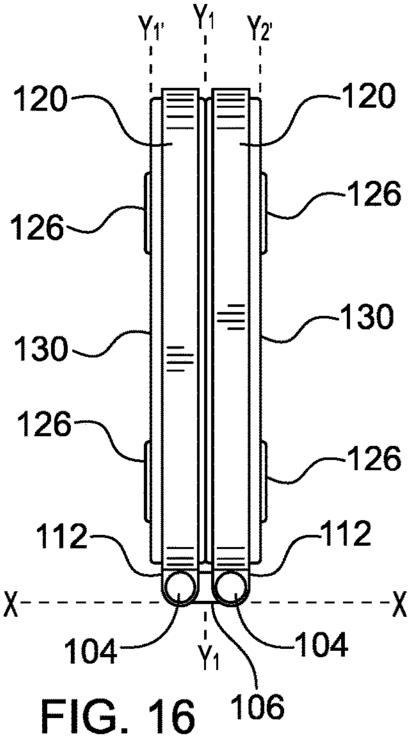
FIG. 16 is a front view of the scale embodiment of FIG. 11 in a storage configuration.

The storage configuration includes the upper surfaces 108 of the weight-bearing platforms 102 either sharing a perpendicular axis $Y_1$ or positioned along different, but parallel, planes $Y_{1'}$ and $Y_{2'}$. These planes are $Y_1$, $Y_{1'}$, and $Y_{2'}$ are perpendicular to the axis X. The bottom surfaces 130 of the weight-bearing platforms 102*a* and 102*b* may be positioned toward each other and the respective feet 126 of each platform 102*a* and 102*b* may touch. Alternatively, the upper surfaces 108 of each platform 102 may be positioned toward each other and touch, such as shown in FIG. 16. In other words, the scale 100 may be closed so that the platforms 102 face each other along the upper surfaces 108 or bottom surfaces 130. This is different than scale 10 embodiment, in which the platforms 12 face each other only along the bottom surfaces 30. The storage configuration of the scale 100 provides is a more compact configuration that allows for easier storage of the device.

In moving between the measurement configuration and the storage configuration, both platforms 102*a* and 102*b* rotate relative to their corresponding rotating members 104*a* and 104*b*, respectively. Further, the rotating members 104*a* and 104*b* both rotate relative to the double-hinge members 106. The opposite can also be true, with the rotating members 104*a* and 104*b* rotating relative to their respective platforms 102*a* and 102*b*, and the double-hinge members 106 rotating relative to one or more rotating members 104*a* and 104*b*.

The scale 100 may also include other features that are not shown but are standard to known scales. The scale 100 may include a power button for turning the device on and off. The scale may also include a USB port for charging an onboard rechargeable battery stored within the scale and supplying power to the electronic components, including sensors, converters, electronics board, display, and other similar components that may be included. The scale 100 may instead have a battery compartment that is configured to house disposable batteries for powering electronic components, including sensors, converters, electronics board, display, and other similar components that may be included.

While the present invention has been described in accordance with preferred elements and embodiments, it is to be understood that certain substitutions and alterations may be made to embodiments of the invention described herein without departing from the spirit and scope of the following claims.

I claim:

1. A foldable personal scale, comprising:

a first weight-bearing platform rotatably secured to a first rotating member such that the first weight-bearing platform is radially rotatable relative to the first rotating member;

a second weight-bearing platform rotatably secured to a second rotating member such that the second weight-bearing platform is radially rotatable relative to the second rotating member; and two double-hinge members, each double-hinge member of said two double-hinge members radially rotatably secured to both the first rotating member and the second rotating member, wherein the first weight-bearing platform comprises four first tube members along a side of the first weight-bearing platform, each first tube member of the four first tube members coaxially secured around the first rotating member; and the second weight-bearing platform comprises four second tube members along a side of the second weight-bearing platform, each second tube member of the four second tube members coaxially secured around the second rotating member.

2. The foldable personal scale of claim 1, wherein a plurality of feet members are secured along a bottom surface of both the first weight-bearing platform and the second weight-bearing platform.

3. The foldable personal scale of claim 1, wherein each of the first weight-bearing platform and the second weight-bearing platform house one or more load sensors configured for measuring a user's weight.

4. The foldable personal scale of claim 3, further comprising a processor, a digital display, and a signal conditioner for transforming a force exerted on the first weight-bearing platform and the second weight-bearing platform into an electrical signal to be displayed on the digital display, and wherein the one or more load sensors are electronically connected to the processor, the digital display, and the signal conditioner.

5. The foldable personal scale of claim 4, wherein the digital display is provided on an upper surface of either the first weight-bearing platform or an upper surface of the second weight-bearing platform.

6. The foldable personal scale of claim 5, further comprising a temperature sensor electronically connected to the processor, the digital display, and the signal conditioner to provide temperature measurements.

7. The foldable personal scale of claim 5, further comprising a Bluetooth module electronically connected to at least the processor to configure the foldable personal scale for wireless communication with other electronic devices.

8. The foldable personal scale of claim 4, wherein the digital display simultaneously displays multiple measurement values, including weight, time, and temperature.

9. The foldable personal scale of claim 1, wherein the foldable personal scale is foldable and unfoldable between a measurement configuration and a storage configuration, the measurement configuration having the first weight-bearing platform and the second weight-bearing platform positioned side-by-side and the storage configuration having an upper surface of the first weight-bearing platform and an upper surface of the second weight-bearing platform positioned against each other.

10. A foldable personal scale, comprising:

a first weight-bearing platform;

a second weight-bearing platform; and an intermediate platform positioned between the first weight-bearing platform and the second weight-bearing platform, wherein one or more double-hinge members connect rotatably to secure the first weight-bearing platform to the intermediate platform and one or more double-hinge members connect rotatably to secure the second weight-bearing platform to the intermediate platform, each double hinge-member of said one or more double-hinge members providing two axes of rotation, and wherein, in a folded configuration of the foldable personal scale, an upper surface of the first weight-bearing platform and an upper surface of the second weight-bearing platform are both oriented perpendicularly to an upper surface of the intermediate platform.

11. The foldable personal scale of claim 10, further comprising a digital display located on the intermediate platform.

12. The foldable personal scale of claim 10, wherein a plurality of feet members are secured along a bottom surface of each of the first weight-bearing platform, the second weight-bearing platform, and the intermediate platform.

13. The foldable personal scale of claim 12, wherein, in the folded configuration of the foldable personal scale, the plurality of feet members of the first weight-bearing platform contact the plurality of feet members of the second weight-bearing platform.

14. The foldable personal scale of claim 10, wherein the first weight-bearing platform, the second weight-bearing platform, and the intermediate platform each have a housing with sloped surfaces.

* * * * *